US005460000A

United States Patent [19]

Kropp

[11] Patent Number: 5,460,000

[45] Date of Patent: Oct. 24, 1995

[54] HYDROSTATIC DRIVE SYSTEM

[75] Inventor: Walter Kropp, Sulzbach am Main, Germany

[73] Assignee: Linde Aktiengesellschaft, Germany

[21] Appl. No.: 141,848

[22] Filed: Oct. 22, 1993

[51] Int. Cl.[6] .......... F16D 31/02

[52] U.S. Cl. .......... 60/422; 60/452; 91/516

[58] Field of Search .......... 91/446, 451, 512, 91/516, 517, 518, 526, 528, 529, 530, 531; 60/422, 445, 452, 468

[56] References Cited

U.S. PATENT DOCUMENTS

| | | | |
|---|---|---|---|
| 4,938,023 | 7/1990 | Yoshino | 91/518 |
| 5,063,742 | 11/1991 | Yoshimatsu | 60/468 |
| 5,134,853 | 8/1992 | Hirata et al. | 91/518 |
| 5,209,063 | 5/1993 | Shirai et al. | 60/422 |

*Primary Examiner*—F. Daniel Lopez

*Attorney, Agent, or Firm*—Thomas R. Shaffer

[57] ABSTRACT

A hydrostatic drive system having consumers (6, 8) connected to a demand regulated pump (1) and actuated by a directional control valve (5, 7) is disclosed. The consumers can be connected downstream of the control valves via return valves to a load-sensing line (12). To provide for load-independent allocation of the delivered flow when the consumers are simultaneously actuated, each directional control valve (5, 7) is assigned a pressure balance (9, 10) which can be controlled directly or indirectly by a signal difference formed from a load pressure signal and a delivered pressure signal. To enable one or more of the consumers (6) to be supplied with pressure medium on a priority basis, so that no reduction in the speed of movement occurs, a priority valve (20) is connected into the LS-line (12) in such manner that in a first operating position of the priority valve (20) the line sections (**12*b*) downstream of the non-return valve(s) of the non-priority consumer(s) (8) are connected to the LS-line (12), and in a second operating position they are connected to a line (4*a*) which conveys the delivered pressure of the pump (1**).

11 Claims, 1 Drawing Sheet

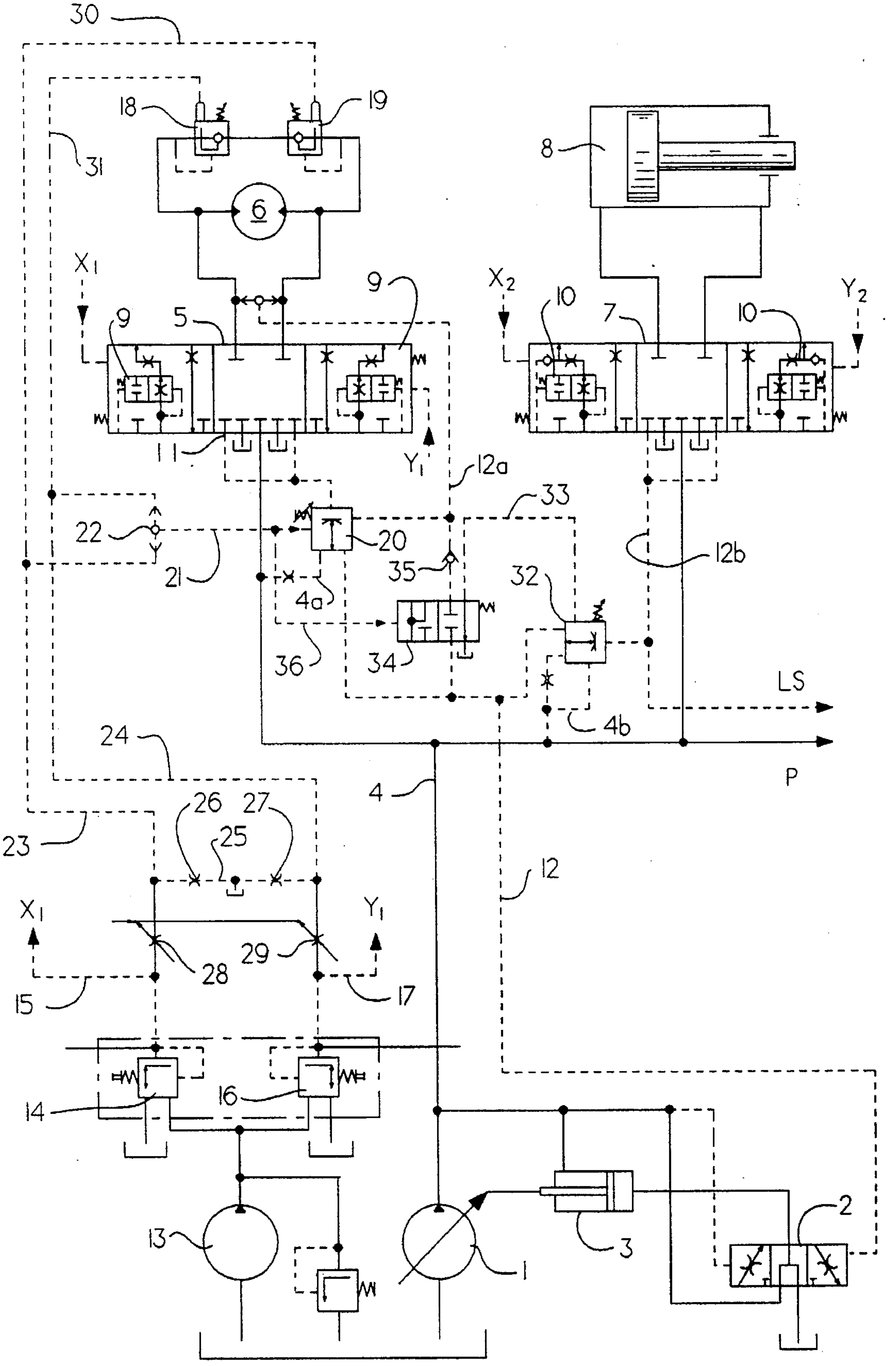
30
18
19
31
8
6
X1
9
5
9
X2
10
7
10
Y2
11
Y1
12a
33
22
20
12b
21
35
32
4a
36
34
LS
4b
24
P
4
26
27
23
25
12
X1
Y1
28
29
15
17
14
16
13
1
3
2

HYDROSTATIC DRIVE SYSTEM

BACKGROUND OF THE INVENTION

1. Field of the Invention

The invention relates to a hydrostatic drive system comprising a required-flow regulated pump and a plurality of consumers which are connected thereto and which can each be actuated by means of a directional control valve, which performs a throttling function in intermediate positions. The consumers can be connected downstream of the directional control valves via non-return valves to a LS-line which leads to a required-flow regulator actively connected to the pump. To provide for load-independent allocation of the delivered flow when consumers are simultaneously actuated, each directional control valve is assigned a pressure compensator which can be controlled directly or indirectly by a signal difference formed from a load pressure signal and a delivered pressure signal. The load pressure signal is derived from the highest of the load pressures occurring downstream of the directional control valves and is conveyed in the LS-line. The delivered pressure signal is derived from the pressure upstream of the directional control valves.

2. Description of the Prior Art

In such drive systems, the degree of opening of the directional control valves, independently of the load pressure of the consumers, determines the volume flow of pressure medium which is supplied to the consumers, and thus the speed of movement (linear or rotational) of the consumers. The ratio of the movement speeds of the individual consumers one to another is continuously maintained by virtue of the action of the pressure compensators, even when the pump delivery capacity is exhausted, in which case the speeds of the consumers are reduced by a proportional reduction in the supply of pressure medium.

SUMMARY OF THE INVENTION

In specific operating states it is, however, desirable to supply one of the consumers with pressure medium on a priority basis to maintain the consumer's speed of movement. Particularly when the pump delivery capacity is exhausted, it is desirable for the consumer's speed of movement not to be reduced or at least maintained at a specified speed as far as possible under all circumstances. Such an operating situation is, for example, that in which, on the actuation of this consumer, other consumers are already exhausted and the pump delivery capacity is exhausted.

The aim of the present invention is to make available a hydrostatic drive system of the type referred to above which is economical to produce and wherein at least one of the consumers has priority over other consumers.

This aim is fulfilled in accordance with the invention in that a priority valve is connected into the LS-line in such manner that in a first operating position of the priority valve the line sections downstream of the non-return valve(s) of the consumer(s) which do(es) not have priority are connected to the LS-line. In a second operating position of the priority valve, such line sections are connected to a line conveying the delivered pressure of the pump. In the direction of the first operating position the priority valve can be acted upon by the delivered pressure of the pump and in the direction of the second operating position can be acted upon by an adjustable spring and, in the case of the actuation of the consumer(s) which has (have) priority, additionally by the load pressure of this (these) consumer(s). Thus, when a consumer which has priority is actuated in the line sections between the non-return valves of the consumers which do not have priority and the priority valve, the load pressure signal is replaced by a delivered pressure signal so that the signal difference which controls each pressure compensator of the aforementioned consumers is changed. More specifically the pressure compensators reduce the quantity of pressure medium flowing to the consumers which do not have priority, and thus reduce the speed of movement of these consumers. The quantity of pressure medium thus obtained is available to the consumer which has priority.

Here it is advantageous to arrange a switching valve downstream of the non-return valve assigned to the consumer which has priority. Said switching valve possesses a first switching position which is operative when the consumer which has priority is unactuated and wherein the connection between said consumer and the LS-line is blocked, and at the same time a line terminating before that control surface of the priority valve which is operative in the direction of the second operating position is connected to an outlet line and which possesses a second switching position which is operative when the consumer which has priority is actuated and wherein the LS-line is connected to the consumer and to the line leading to the control surface of the priority valve. The priority valve thus operates in dependence upon the actuation of the directional control valve assigned to the consumer which has priority.

The actuation of the consumer which has priority can easily be detected in that the switching valve can be switched by the control pressure acting upon the directional control valve of the consumer which has priority.

As previously explained, the pressure compensators, which are also referred to as load compensators, provide that when the pump delivery capacity is adequate the speed of the consumers remains uniform in all operating states. When consumer demand for fluid is greater than the pump capacity, at least the speed ratio of the consumers one to another is maintained. The pressure balances can be arranged upstream or downstream of the directional control valves. It is also possible to integrate the pressure balances into the directional control valves. The speed of movement of the consumers is continuously predetermined by the actuation of the directional control valves. It is not possible to control the driving force and driving moment of the consumers using such drive systems, although this would be desirable for many applications.

To ensure that the pressure medium is supplied to a consumer at a specified pressure (which is equivalent to predetermining a specified driving force and a specified driving moment), the signal difference across the pressure compensator of at least one consumer can be influenced by the output signal of a pressure control valve in the sense of a limitation of the through-flow across the pressure compensator. The pressure compensator for load-independent delivered flow allocation is thus also used to regulate the driving force and driving moment of the consumer. Nevertheless, it is also possible to actuate the consumer in the usual manner, namely by predetermining a theoretical value for the speed of movement. If, on the other hand, the driving force and the driving moment are to be limited, the pressure compensator is influenced in dependence upon a theoretical value which is to be predetermined and which defines the output signal of the adjustable pressure control valve. The force and moment regulation is thus controllable. The pressure compensator is influenced by changing the signal difference, which in most cases is formed directly across the pressure compensator. For this purpose, preferably the signal which is operative in the closing direction is increased so that the pressure compensator moves in the closing direction. This effect could also be achieved by reducing the signal which is operative in the opening direction.

It is particularly favorable to apply this further development of the invention to a consumer which is preferably a consumer which can be supplied with pressure medium. This consumer can therefore be supplied adjustably and with priority which, for example, is manifest in the fact that this consumer is not influenced by the switching on and off of other consumers.

An advantageous embodiment of the invention provides that the pressure compensator possesses a control surface which is operative in the closing direction and which can be acted upon by the output-end pressure of the pressure control valve. Said control valve possesses two inputs, of which the first input is connected to a line which conveys the highest load pressure of all the consumers, and the second input is connected to a line which conveys the delivered pressure of the pump. The pressure control valve can be acted upon in the direction of an operating position, which connects the first input to the output, by a preferably adjustable spring and by a variable control signal, and can be acted upon in the direction of an operating position, which connects the second input to the output, by a signal derived from the individual load pressure of the consumer. The variable control signal which acts upon the small and thus cheaply produced pressure control valve represents the theoretical value by which the driving force and driving moment, which are to be regulated, of the consumer are predetermined.

The control signal can be generated in any manner, for example, electrically. However, it is favorable for the directional control valve which performs a throttling function in intermediate positions to be able to be hydraulically operated by the pressure in a control pressure line where the control pressure line is connected to a control pressure branch line which leads to a control surface of the pressure control valve which is operative in the direction of the operating position connecting the first input to the output. In this way, the driving force and driving moment are regulated in dependence upon the control pressure which acts upon the directional control valve. In the case of the hydraulic operation of the directional control valve, the means required to generate a control signal are already available and therefore it is sufficient to establish a connection from the control pressure to the pressure control valve which is easily possible. The control pressure can optionally be modified in order to obtain a particularly suitable variable control signal.

For this purpose, it proves advantageous to connect the control pressure branch line to an outlet line with a constant choke and to precede the outlet line by an adjustable choke. By changing the throttling cross-section of the adjustable choke, it is possible to adjust the curve of the driving force and driving moment, i.e. the curve of this value in dependence upon the variable control pressure.

In the case of a consumer which can be actuated in both directions, for example a hydraulic motor, in accordance with a further development of the invention it is provided that each operating direction is assigned a respective pressure limiting valve which can be acted upon in the opening direction by the load pressure of the consumer and in the closing direction by an adjustable spring and a variable control signal. This has the advantage that the braking moment (in the case of a hydraulic motor) and the braking force of the consumer are regulated in dependence upon a theoretical which is to be predetermined.

The outlay required for this purpose is low if the pressure limiting valve, which is anyhow provided for the protection of the consumer, is provided with a control surface which operates in the closing direction and before which a line connected to the control pressure branch line terminates. Both the driving and the braking moment are therefore adjusted by control pressure from the same control pressure source, namely the control pressure source provided for driving the directional control valve. The maximum and minimum protection pressure of the pressure limiting valves are adjustable separately from one another with the minimum protection pressure being dependent upon the setting of the spring, and the maximum protection pressure being dependent upon the sum of the spring force and the force generated by the control pressure.

It is expedient to use the invention in a drive system in which the consumer has the form of a hydraulic motor, in particular a hydraulic motor for driving an excavator slewing gear, as instantaneous control of the superstructure drive mechanism is very often required in such cases.

BRIEF DESCRIPTION OF THE DRAWING

The invention will be explained in detail with reference to the exemplary embodiment schematically illustrated in the accompanying drawing, which shows the schematic switching plan of a hydrostatic drive system according to the invention.

DETAILED DESCRIPTION OF THE PREFERRED EMBODIMENT

Referring to the Figure, a pump 1, which is adjustable in respect of its delivered volume, comprises a required-flow regulator 2 which controls a cylinder-piston arrangement 3 for adjusting the delivered volume of the pump 1. The pump 1 is connected via a delivery line 4 to a directional control valve 5 which controls a first consumer 6, which in this exemplary embodiment is a hydraulic motor. The hydraulic motor 6 can be operated in two directions and is to be assigned, in this example, to the slewing drive mechanism of an excavator. The delivery line 4 is additionally connected to a directional control valve 7 with which a second consumer 8, in the form of a hydraulic cylinder, can be actuated. Further consumers can also be supplied by the pump 1 by connecting them to delivery line 4 at P.

For load-independent delivered flow allocation, each consumer 6 and 8 is assigned a respective pair of pressure compensators 9 and 10 which are integrated in their respective directional control valves 5 and 7. Each pressure compensator 9, 10 has a closing and an opening position. In the example, a respective pressure compensator is provided for both actuating directions of the consumers. It is also possible to provide only one pressure compensator for each directional control valve 7 and 9, such a pressure compensator being connected in such a manner as to be operative in both actuating directions of the valve.

To avoid unnecessary repetition, in the following the function only of the left-hand pressure compensator 9 in the directional control valve 5, which can be controlled directly by a signal difference, will be described. Here "directly" is to be understood as a direct reproduction of the signal difference across the pressure compensator. Indirect control would be that in which the signal difference were formed at a different location and only the result were communicated to the pressure compensator. The signal difference is formed from a load pressure signal and a delivered pressure signal. Normally, the load pressure signal is derived from the highest of the load pressures of all the actuated consumers. For the direct reproduction of the signal difference across the pressure compensator 9, the latter possesses a control surface which is operative in the opening direction and can be acted upon by the pressure upstream of the directional control valve 5. In the closing direction, the pressure compensator can be acted upon by the pressure conveyed in a line 11. For the predetermination of the movement speed, the pressure in line 11 is usually one of the pressures downstream of the directional control valves 5 or 7, namely the highest of the load pressures of the consumers 6 and 8. In the closing direction the force of a spring is also always active. This spring force corresponds to the force of a spring acting on the required-flow regulator 2.

If none of the consumers 6 and 8 is actuated because the directional control valves 5 and 7 are in the blocked state, the pump 1 delivers only leakage oil and thus assumes a setting with a low delivered volume, where the delivered volume and the delivered pressure are determined by the spring of the required-flow regulator 2. An equilibrium of forces acting on a moving control member is obtained in the required-flow regulator 2. Here, the spring force counteracts a force which originates from the delivered pressure acting upon a control surface of the control member.

When the consumer 6 is required to operate, the directional control valve 5 is actuated to provide a connection between the pump 1 and the consumer 6. The pressure which builds up downstream of the directional control valve 5 is communicated by a so-called LS-line 12 (load-sensing line) to the spring side of the required-flow regulator 2, with the result that the previously prevailing equilibrium is disturbed and the pump 1 is supplied with a signal to increase the delivered volume. Then the delivered volume of the pump 1 increases and consequently also the delivered pressure of the pump. Above a specified delivered pressure, the consumer 6 is set in motion. The opening which is released in the directional control valve 5 here acts as measurement choke across which a pressure drop delta p occurs. The delivered volume of the pump 1 is increased until a pressure drop delta p occurs across the measurement choke, which pressure drop corresponds to the spring bias of the required-flow regulator 2.

If the second consumer 8 is switched on and if a greater load pressure prevails therein than in the first consumer 6, the delivered volume of the pump 1 is adjusted in accordance with the requirement of the second consumer 8. To prevent any increase occurring now in the speed of movement of the first consumer 6, the pressure compensator 9 assigned to the directional control valve 5 throttles the in-flowing pressure medium until the pressure drop across the through-flow opening (measurement choke) of the directional control valve corresponds again to the given value. The speed of movement of the first consumer 6 is consequently not only independent of its own load pressure but also independent of the load pressure of the second consumer 8.

The directional control valves 5 and 7 seen in the figure are driven hydraulically. The means required for this purpose are shown in the example of the driving of the directional control valve 5. A constant pump 13 acts upon a control pressure generator 14 which generates a control pressure $x_1$ which is conveyed in a control pressure line 15. By applying pressure $x_1$ to valve 5, the directional control valve 5 is moved to the right in the figure. Additionally, a control pressure generator 16 is acted upon by the constant pump 1 and generates a control pressure $y_1$ which, when applied to the valve 5 via control pressure line 17, moves the directional control valve 5 to the left in the figure.

For the protection of the hydraulic motor, a respective pressure limiting valve 18 and 19 is provided for each direction of actuation.

Hitherto, the hydrostatic drive system corresponds to the prior art.

The output of a pressure control valve 20 is connected to the line 11 which communicates with that control surface of the pressure compensator 9 which operates in the closing direction. The pressure control valve 20 possesses two inputs, of which one input is connected to the LS-line 12 and the other input is connected to a line 4*a* which branches off from the delivery line 4 of the pump 1. The pressure control valve possesses two switching positions, namely a first switching position in which the LS-line 12 is connected to the line 11, and a second switching position in which the line 4*a* conveying the delivered pressure is connected to the line 11. Between the two switching positions intermediate positions can be provided. The pressure control valve 20 is biased in the direction of the first switching position, preferably by a spring whose force is adjustable. Additionally, a control surface which operates in the direction of the first switching position is provided on the pressure control valve 20. This control surface can be acted upon by the pressure in a line 21 which is connected via a change-over valve 22 to respective control pressure branch lines 23 and 24 connected to the control pressure lines 15 and 16. A control surface of pressure control valve 20 which is operative in the direction of the second switching position can be acted upon by the pressure in a line section 12*a* of the LS-line 12 upstream of a non-return valve 25 which opens in the direction of the required-flow regulator. This pressure is the load pressure of the consumer 6.

When the consumer 6 is actuated, control pressure $x_1$ or $y_1$ acts both upon the directional control valve 5 and upon the pressure control valve 20 in the direction of its first switching position. The control surface of the relevant pressure compensator 9 which operates in the direction of the closing position is therefore connected via the line 11 to the LS-line 12 so that here the highest of all the load pressures comes to bear.

As soon as the force which arises from the load pressure of the consumer 6 (hydraulic motor) proportional to the driving moment and which acts upon the pressure control valve 20 exceeds the opposing sum of the spring force and the control pressure force, the pressure control valve 20 connects the output-end line 11 to the line 4*a* which conveys the delivered pressure, so that the pressure compensator 9 is moved in the closing direction, whereby no further increase occurs in the load pressure of the consumer 6, and consequently, its driving moment is limited.

Here, the equilibrium across the pressure control valve 20 is determined by the level of the variable control pressure which acts on the control surface which is operative to move the pressure control valve 20 in the direction of the first switching position. As a result, any desired limit value can be selected for the driving moment. Until the attainment of this predetermined limit value of the driving moment, the delivered flow allocation is load-independent, the speed of movement of the consumer 6 being predetermined by the directional control valve.

To facilitate the adjustment of the curve of the driving moment, the control pressure branch lines 23 and 24 are each connected to an outlet line 25 via a respective constant choke 26 and 27, and adjustable chokes 28 and 29 respectively are connected upstream of the outlet line 25 in the direction of each control pressure branch line 23 and 24. By changing the throttling cross-section of the adjustable chokes 28 and/or 29, it is possible to select the curve of the driving moment in dependence upon the variable control pressure.

The pressure-limiting valve 18 and 19, which serve to protect the consumer 6, can be acted upon in the opening direction by the load pressure of the consumer 6 and in the closing direction by an adjustable spring and a variable control signal. For this purpose, each pressure limiting valve 18 and 19 is provided with a respective control surface on which the pressurized fluid in lines 30 and 31 respectively, connected to the respective control pressure branch lines 23 and 24 is operative in the closing direction. The maximum and minimum protection pressures of the pressure limiting valves 18 and 19 are therefore adjustable separately from one another, where the minimum protection pressure is dependent upon the setting of the spring, and the maximum protection pressure is dependent upon the sum of the spring force and the force generated by the control pressure.

This has the advantage that the braking moment of the consumer 6 can also be regulated in dependence upon a theoretical value to be predetermined; the outlay required for this purpose is low as the pressure limiting valve 18 and 19, provided in any event for the protection of the consumer 6, additionally assumes this function. Thus, both the driving and the braking moment are set by control pressure from the same control pressure source, namely the control pressure source provided for the driving of the directional control valve.

Connected into the LS-line 12 is a priority valve 32 which in a first operating position connects a line section **12*b*, which branches off from the consumer 8 downstream of the directional control valve 7 via a non-return valve, to the required-flow regulator 2, and in a second operating position connects this line section to a line 4*b* which branches off from the delivered pressure line 4. The priority valve 32 can be acted upon in the direction of the first operating position by the delivered pressure of the pump 1 which acts on a correspondingly arranged control surface, and can be acted upon in the direction of the second operating position by an adjustable spring and by the pressure in a line 33** which communicates with a correspondingly arranged control surface.

Downstream of the non-return valve 35 assigned to the consumer 6 is arranged a switching valve 34 which possesses a first and a second switching position. In the first switching position, the connection from the line section **12*a* to the LS-line 12 is blocked, and the line 33, which communicates with that control surface of the priority valve 32 operative in the direction of the second operating position, is connected to an outlet line. In the second switching position, the LS-line 12 is connected both to the line section 12*a* and to the line 33 which leads to the control surface of the priority valve 32**.

The switching valve 34 is initially maintained in the first switching position by the (small) force of a spring. The switch-over into the second switching position is effected by control pressure which is conveyed in the line 36 which branches off from the line 21. When the consumer 6 is unactuated, the switching valve 34 remains in the first switching position. The second switching position comes into operation as soon as the consumer 6 is actuated as a result of the conveyance of control pressure to its directional control valve 5. In this case, that control surface of the priority valve 32 which is operative in the direction of the second operating position is acted upon by the pressure in the LS-line 12. The priority valve 32 thus operates in dependence upon the driving of the directional control valve 5 assigned to the first consumer 6 and ensures that the pressure compensator 10 of the consumer 8 (and optionally the pressure compensators of further consumers) is moved in the closing position so that the consumer 6 is supplied with priority with pressure medium.

The degree of priority given to the consumer 6 is adjustable in the present case by virtue of the level of the control pressure which determines the level of the load pressure of the consumer 6, where this load pressure is conveyed in turn by the switching valve 34 to the control surface of the priority valve 32.

It is thus possible to give priority to the consumer 6 in specific operating situations. Such an operating situation is, for example, that in which, in addition to the consumer 6, further consumers are actuated but the delivery capacity of the pump 1 has already been fully taken up.

While certain presently preferred embodiments of the present invention have been described and illustrated, it is to be distinctly understood that the invention is not limited thereto but may be otherwise embodied and practiced within the scope of the following claims.

I claim:

1. A hydrostatic drive system comprising a required-flow regulated pump and a plurality of consumers connected to said pump, said pump providing a delivered flow to said consumers, said consumers each capable of being actuated by means of a directional control valve which performs a throttling function in intermediate positions, each said control valve providing an output signal and having a control pressure acting thereon, and downstream of the directional control valves, said consumers are adapted to be connected via non-return valves to a LS-line (12) which leads to a required-flow regulator actively connected to the pump, wherein, for load-independent allocation of the delivered flow in the case of simultaneously actuated consumers, each directional control valve is assigned a pressure compensator which can be controlled directly or indirectly by a signal difference formed from a load pressure signal and a delivered pressure signal, where the load pressure signal is derived from the highest of the load pressures occurring downstream of the directional control valves and is conveyed in the LS-line and where the delivered pressure signal is derived from the pressure upstream of the directional control valves, and wherein a priority valve (20) is connected into the LS-line (12) in such manner that in a first operating position of the priority valve (20) line sections (**12*b*) located downstream of the non-return valve(s) of the consumer(s) (8) which does not (do not) have priority are connected to the LS-line (12), and in a second operating position said line sections (12*b***) are connected to a line (*4a*) conveying the delivered pressure of the pump (1), wherein said priority valve (20) is adapted to be acted upon in the direction of the first operating position by the delivered pressure of the pump (1) and is adapted to be acted upon in the direction of the second operating position by an adjustable spring and, in the case of the actuation of the consumer(s) (6) which has (have) priority, additionally by the load pressure of said consumer(s) (6) having priority.

2. A hydrostatic drive system according to claim 1, further comprising a switching valve (34) provided downstream of said non-return valve (35) which is assigned to the consumer (6) which has priority said switching valve having a first switching position which is operative when the priority consumer (6) is unactuated and wherein the connection between said priority consumer and the LS-line (12) is blocked and at the same time a line (33), which communicates with that control surface of the priority valve (32) operative in the direction of the second operating position, is connected to an outlet line, and a second switching position which is operative when the priority consumer (6) is actuated and wherein the LS-line (12) is connected to the priority consumer (6) and to the line (33) leading to the control surface of the priority valve (32).

3. A hydrostatic drive system according to claim 2, wherein said switching valve 34 is adapted to be switched by the control pressure which acts upon the directional control valve (5) of the priority consumer (6).

4. A hydrostatic drive system according to claim 1, further comprising a pressure control valve 9 having an output signal, wherein the signal difference across the pressure compensator (9) of at least one consumer (6) is influenced by the output signal of said pressure control valve (20) by limiting through-flow across the pressure compensator (9).

5. A hydrostatic drive system according to claim 4, wherein the at least one consumer across whose pressure compensator the signal difference is influenced is a priority consumer.

6. A hydrostatic drive system according to claim 4, wherein the pressure compensator (9) has a control surface which is operative in a closing direction and which is adapted to be acted upon by the output signal of the pressure control valve (20), said output signal being a pressure signal, the pressure control valve 20 having first and second inputs and an output, of which the first input is connected to a line (12) which conveys the highest load pressure of all the consumers, and the second input is connected to a line (4*a*) which conveys a delivered pressure of the pump (1), and where the pressure control valve (20) is adapted to be acted upon in the direction of an operating position, which connects the first input to the output, by a preferably adjustable spring and by a variable control signal, and is adapted to be acted upon in the direction of an operating position, which connects the second input to the output, by a signal derived from the individual load pressure of the at least one consumer (6) across whose pressure compensator the signal difference is influenced.

7. A hydrostatic drive system according to claim 6, further comprising a control pressure line (15 and 17) having a pressure therein, wherein the directional control valve (5), which performs a throttling function in intermediate positions, is adapted to be hydraulically operated by the pressure in said control pressure line (15 and 17), wherein the control pressure line (15 and 17) is connected to a control pressure branch line (23 and 24) which leads to a control surface of the control valve (20) which is operative in the direction of the operating position which connects the first input to the output.

8. A hydrostatic drive system according to claim 7, wherein the control pressure branch line (23 and 24) is connected to an outlet line (25) by means of a constant choke (26 and 27), and an adjustable choke (28 and 29) is placed in each control pressure branch line upstream of the outlet line (25).

9. A hydrostatic drive system according to claim 4, where the at least one consumer (6) across whose pressure compensator the signal difference is influenced can be actuated in both an opening direction and a closing direction, wherein each operating direction is assigned a respective pressure limiting valve (18 and 19) which are adapted to be acted upon in the opening direction by the load pressure of the consumer (6) and are adapted to be acted upon in the closing direction by an adjustable spring and a variable control signal.

10. A hydrostatic drive system according to claim 9, wherein said pressure limiting valve (18 and 19) is provided with a control surface which is operative in the closing direction and with which a line connected to the control pressure branch line (23 and 24) communicates.

11. A hydrostatic drive system according to claim 1, wherein the priority consumer (6) has the form of a hydraulic motor producing a rotating movement.

* * * * *

UNITED STATES PATENT AND TRADEMARK OFFICE
CERTIFICATE OF CORRECTION

PATENT NO. : 5,460,000

DATED : October 24, 1995

INVENTOR(S) : Walter Kropp

It is certified that error appears in the above-identified patent and that said Letters Patent is hereby corrected as shown below:

Item [57]

In the Abstract, line 10, change "balance" to --compensator--.

Signed and Sealed this

Twelfth Day of November, 1996

Attest:

BRUCE LEHMAN

*Attesting Officer* *Commissioner of Patents and Trademarks*